(No Model.)

M. DEHNERT.
PNEUMATIC MUSTARD POT.

No. 382,218. Patented May 1, 1888.

Witnesses.
James M. Pully.
James F. Hoyne.

Inventor.
Max Dehnert.
per George Haseltine.
Attorney.

UNITED STATES PATENT OFFICE.

MAX DEHNERT, OF DEUBEN, SAXONY, GERMANY.

PNEUMATIC MUSTARD-POT.

SPECIFICATION forming part of Letters Patent No. 382,218, dated May 1, 1888.

Application filed December 12, 1887. Serial No. 257,593. (No model.)

*To all whom it may concern:*

Be it known that I, MAX DEHNERT, of the town of Deuben, Saxony, Germany, have invented certain new and useful Improvements in Pneumatic Mustard-Pots, of which I declare the following to be a specification.

My invention relates to an improved pneumatic mustard-pot for use in private houses, dining-saloons, boarding-houses, and the like.

My improved mustard-pot consists of a funnel-shaped vessel with a small opening at the lower smaller end, said vessel being kept continuously closed at its upper end by means of an appropriate cover or lid of elastic material, so that by pressing on the said elastic cover or lid with the finger any desired quantity of mustard can be discharged from the opening to the vessel without employing a spoon.

Figure 2:
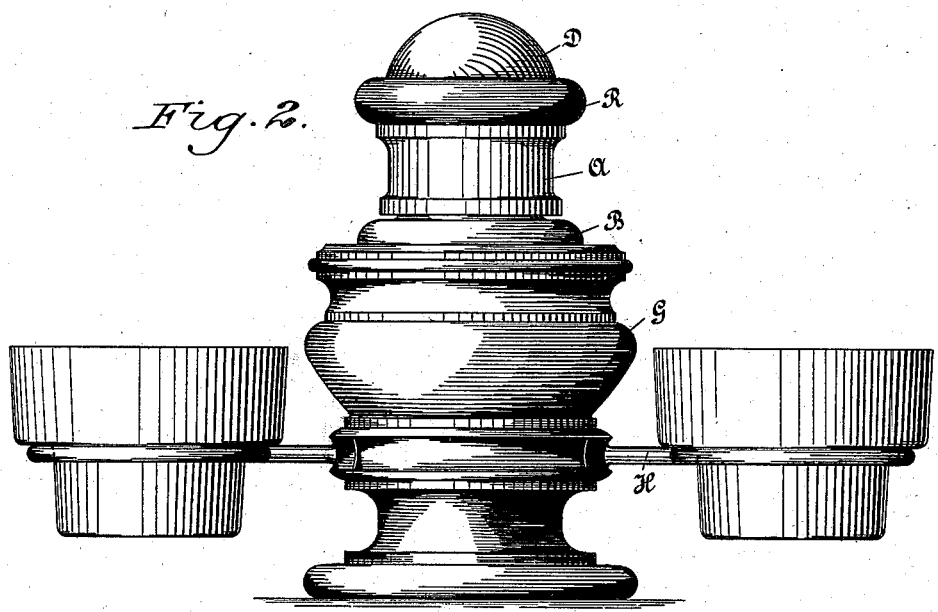
Figure 1:
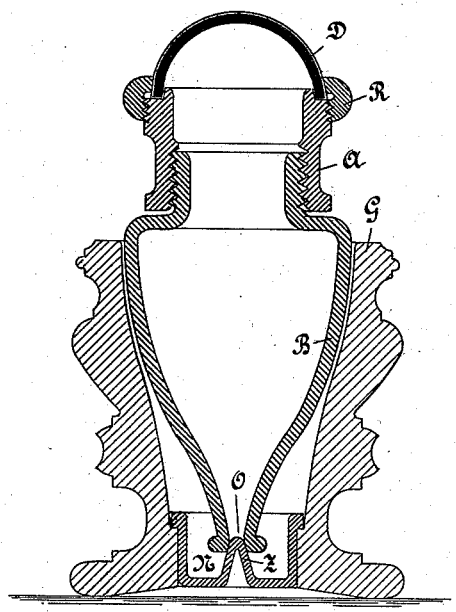

Figure 1 is a vertical section of my improved mustard-pot. Fig. 2 is an elevation of the same, whereby the receptacle or outer vessel, G, is shown as combined with holders H for salt and pepper vessels, or for oil and vinegar.

G is the exterior receptacle or stand; B, the mustard-pot inserted in the same; A, a ring screwed onto the mustard-pot, and to which the elastic cover D is attached by means of the ring R.

N is a small pan or receptacle with conical projection Z, which is inserted in the receptacle G, in order to catch any small quantity of mustard which might escape from the mustard-pot B.

My improved pneumatic mustard-pot is operated as follows: The pot B is removed from the stand or receptacle G and the point or smaller end held over the spot where it is desired to deposit the mustard, and the india-rubber or other elastic cover, D, pressed downward with the finger. The air-pressure so produced in the pot B will cause the mustard to pass out at the opening O in the form of a thin stream as long as the pressure on the elastic cover is maintained, so that any desired part of the contents of the said pot can be removed from the same. As soon as the pressure is removed from the cover D, the mustard will cease to flow, and the pot is then inserted in the stand G with its opening O downward, so that the same will fit over the projection Z of the pan N, and in this manner the orifice be securely closed.

The advantages of my improved pneumatic mustard-pot are that no spoon is required, the mustard is always inclosed in the pot, so that evaporation is prevented, the mustard retained in proper consistent form, and is carefully protected from impurities.

My improved pneumatic mustard-pot can be readily combined with receptacles for salt and pepper or for oil and vinegar, rendering extra cruet-stands unnecessary.

Having now described my said invention, so as to enable those versed in the art to carry out the same, I claim—

1. The combination, with the mustard-pot having the perforated neck at its lower end and a removable elastic cover at its upper end, of a supporting-stand provided at its base with a projection to close the perforation in the neck, substantially as set forth.

2. As a new article of manufacture, a funnel or conical shaped pneumatic mustard-pot, consisting of the mustard-receptacle B, having an opening, O, at its point or smaller end, and provided with an elastic cover, such as D, for exerting pneumatic force, in combination with the elastic-cover attachment A R and exterior receptacle or holder, G, in the lower end of which is inserted a small pan, such as N, having the projection Z for closing the opening O, substantially as shown, and for the purpose set forth.

In witness whereof I have hereunto signed my name in the presence of two subscribing witnesses.

MAX DEHNERT.

Witnesses:
OTTO WOLFF,
PAUL DRUCKMÜLLER.